United States Patent
Hu et al.

(10) Patent No.: US 10,010,732 B2
(45) Date of Patent: *Jul. 3, 2018

(54) APPARATUS, METHODS, AND SYSTEMS FOR MONITORING FIRE EXTINGUISHER OPERATIONAL READINESS

(71) Applicant: NEC Laboratories America, Inc., Princeton, NJ (US)

(72) Inventors: Junqiang Hu, Davis, CA (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,406

(22) Filed: Jan. 23, 2017

(65) Prior Publication Data

US 2017/0209725 A1     Jul. 27, 2017

Related U.S. Application Data

(60) Provisional application No. 62/286,039, filed on Jan. 22, 2016, provisional application No. 62/286,040, filed on Jan. 22, 2016.

(51) Int. Cl.
*G08C 19/22* (2006.01)
*A62C 37/50* (2006.01)
*A62C 13/76* (2006.01)

(52) U.S. Cl.
CPC .............. *A62C 37/50* (2013.01); *A62C 13/76* (2013.01)

(58) Field of Classification Search
CPC ..................................................... A62C 37/50
See application file for complete search history.

(56) References Cited

U.S. PATENT DOCUMENTS

| 6,125,940 A * | 10/2000 | Oram ..................... A62C 13/76 169/23 |
| 2006/0273896 A1* | 12/2006 | Kates ................. G08B 21/0236 340/539.18 |
| 2008/0037902 A1* | 2/2008 | Matsumoto ............... G06T 3/40 382/299 |
| 2016/0037135 A1* | 2/2016 | McSheffrey ........... H04N 7/183 348/143 |

* cited by examiner

*Primary Examiner* — Amine Benlagsir
(74) *Attorney, Agent, or Firm* — Joseph Kolodka (57) ABSTRACT

Aspects of the present disclosure describe apparatus, methods and systems for monitoring the operational status of fire extinguishers through the utilization of optically sensed, color profile determinations of a pressure gauge positioned on the fire extinguisher as well as the utilization of vibrational, and location sensing devices. Advantageously, monitoring apparatus according to the present disclosure are networkable, and a number of their operational characteristics may be configured via the network and associated servers. Furthermore, monitoring apparatus according to the present disclosure may employ vibrational, acceleration, GPS, RFID, and ultrasonic sensors to detect movement, location, and obstructions. In sharp contrast to the prior art, apparatus, methods and systems according to the present disclosure operate with existing fire extinguishers and provide a convenient, cost effective, and highly functional upgrade path for deployed fire extinguishers.

19 Claims, 10 Drawing Sheets

APPARATUS, METHODS, AND SYSTEMS FOR MONITORING FIRE EXTINGUISHER OPERATIONAL READINESS

CROSS REFERENCE TO RELATED APPLICATIONS

This application claims the benefit of U.S. Provisional Patent Application Ser. No. 62/286,039 filed Jan. 22, 2016 and U.S. Provisional Patent Application Ser. No. 62/286,040 filed Jan. 22, 2016 which are incorporated by reference as if set forth at length herein.

TECHNICAL FIELD

This disclosure relates generally to systems and methods for personal and property protection and safety. More particularly it pertains to methods and apparatus for monitoring the operational status and readiness of fire extinguishers.

BACKGROUND

As is known, a fire extinguisher is a fire protection device used to extinguish or control small fires, often in emergency situations. Portable fire extinguishers in particular play an important role in early fire-fighting. Studies have shown that more than 80% of fire incidents are successfully extinguished and approximately 75% of these do not require subsequent professional fire fighter (fire department) involvement.

Given their importance the operational status and readiness of a fire extinguisher needs to be periodically checked to verify it will operate properly when needed. In fact, the National Fire Protection Agency (NFPA) mandates monthly inspection to verify operational characteristics including: extinguisher(s) are located in designated place(s); no obstruction(s) to access or visibility; safety seals are present and unbroken; no evidence of physical damage corrosion, leakage or obstructed nozzle; pressure gauge readings in the proper range or position; operating instructions are legible and outward facing; and fullness.

As will be appreciated, such verification is time consuming for businesses and may not even be performed by homeowners.

Given this difficulty and the recognized importance of fire extinguishers and their operational readiness, methods and apparatus that provided an easier readiness determination—particularly with respect to their degree of pressurization—would represent a welcome addition to the art.

SUMMARY

The above problem(s) are solved and an advance in the art is made according to aspects of the present disclosure directed to apparatus and methods for monitoring the degree of pressurization of a fire extinguisher. In sharp contrast to the prior art, apparatus and methods according to the present disclosure work with existing fire extinguishers and provide for the easy, in-field, in-service retrofit of existing, deployed, operational fire extinguishers.

Viewed from a first aspect monitoring apparatus according to the present disclosure monitors an operating status of a fire extinguisher and through the effect of monitoring a color profile of a pressure gauge associated with the fire extinguisher using one or more optical sensors. Upon determining that a change in operational status has occurred, the monitoring apparatus of the present disclosure may effect an alarm or other notification—as appropriate. Additional aspects of the present disclosure facilitate the monitoring of a specific region of the pressure gauge.

Viewed from another aspect, monitoring apparatus and networked systems operate in combination to monitor the operating status of a fire extinguisher and—in conjunction with the networked systems—monitor, log, and alter the operational characteristics of monitoring apparatus such that more effective monitoring of the fire extinguishers is provided. In this networked systems operational configuration, alternative sensor structures including vibration sensors, accelerometers, GPS, RFID, and ultrasound sensors may be employed to determine—in addition to basic operational status—location, and/or physical obstruction and resulting accessibility of the fire extinguisher.

As noted before, and in sharp contrast to existing, prior art apparatus, methods and systems, applications according to the present disclosure will advantageously operate in conjunction with existing, deployed fire extinguishers and therefore permit their retrofit.

BRIEF DESCRIPTION OF THE DRAWING

A more complete understanding of the present disclosure may be realized by reference to the accompanying drawing in which.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

Figure 1:
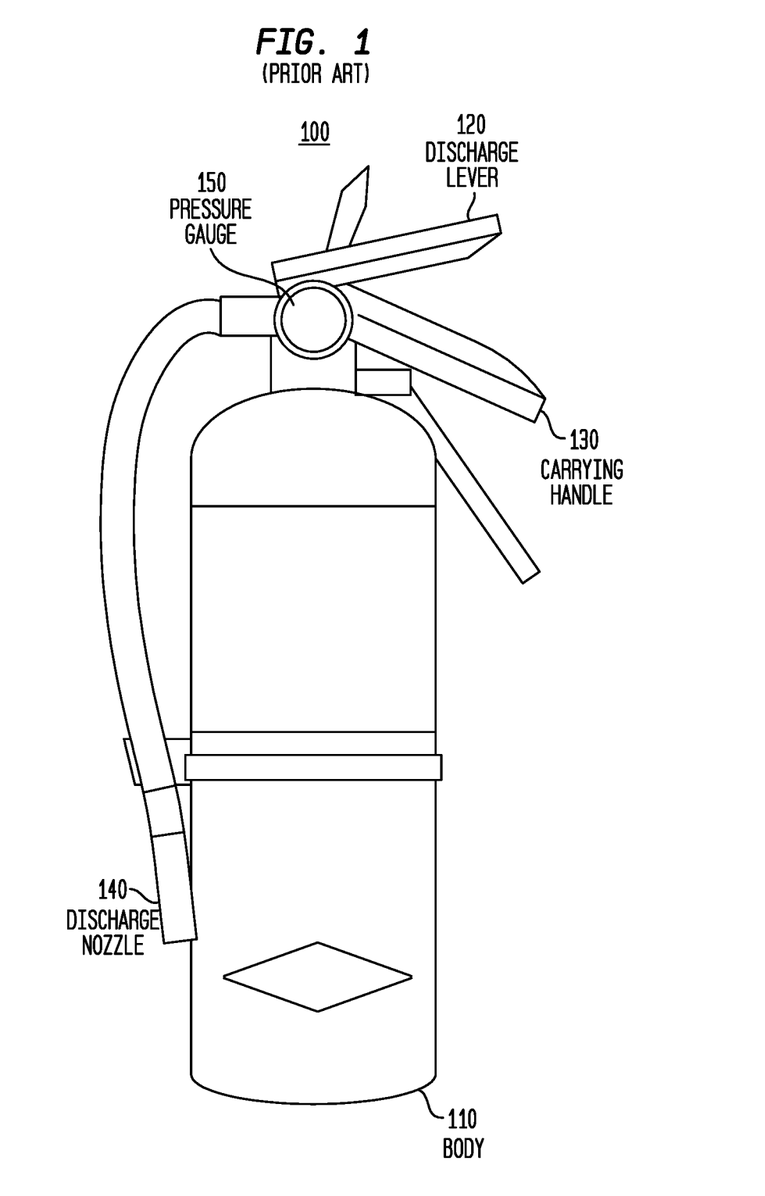
FIG. 1 is a diagram illustrating a prior art portable fire extinguisher.

Turning now to FIG. 1, there is shown a topmost view of a contemporary, prior art fire extinguisher 100. As may be observed in that FIG. 1, such fire extinguisher 100 includes a body 110, discharge lever 120, carrying handle 130, discharge nozzle 140, and pressure gauge 150. As will be known and understood by those skilled in the art, operation of such a fire extinguisher 100 involves pointing the discharge nozzle 140 at the base of a fire to be extinguished and depressing discharge lever 120. Assuming that the extinguisher is charged and sufficiently pressurized then a fire extinguishing agent will be output under pressure by the discharge nozzle 140 and (hopefully) extinguish the fire.

Figure 2:
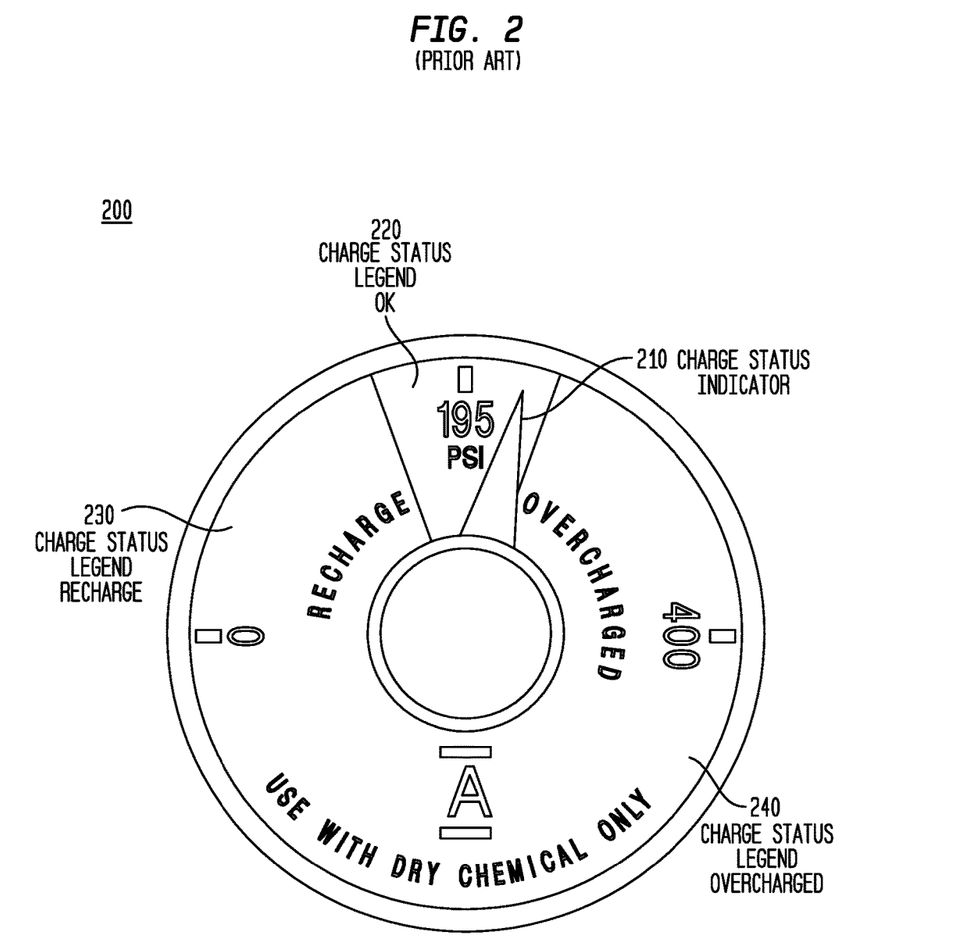
FIG. 2 is a diagram illustrating a prior art pressure gauge for a portable fire extinguisher.

FIG. 2 is a view of a pressure gauge 200 such as that shown in FIG. 1. With reference to FIG. 2, it may be observed that a pressure gauge 200 includes a charge status indicator (yellow arrow) 210 and a charge status legend having several identifiable regions namely: charge status legend OK region 220, charge status legend RECHARGE region 230 and charge status legend OVERCHARGED region 240. In particular embodiments, the region(s) are identified not only by their relative location(s) but also by their color. In the illustrative example shown in FIG. 2, the OK charge status legend region is the color green, while the RECHARGE and OVERCHARAGE charge status regions are red.

As will be understood by those skilled in the art, the rotational position of the charge status indicator 210 changes as a function of the internal pressure of the fire extinguisher. Accordingly—and as will be readily understood—when the charge status indicator 210 is in the green, charge status legend OK region 220 the extinguisher is operational. Conversely, when the charge status indicator is in the red RECHARGE 230 or OVERCHARGED 240 region(s), it may not be correctly operational.

As noted previously, personally monitoring the operational status of individual fire extinguishers may be time consuming for businesses having a large number of such extinguishers or difficult for homeowners who are unfamiliar with their operation.

Accordingly, the present disclosure describes apparatus and methods that automatically monitor the operational status of fire extinguishers. Such monitoring is performed by a monitoring apparatus that is affixed to the pressure gauge of the fire extinguisher. In sharp contrast to the prior art, the monitoring apparatus of the present disclosure will allow the convenient retrofit of existing fire extinguishers and may further advantageously be incorporated into a network via wired or wireless technologies.

Figure 3:
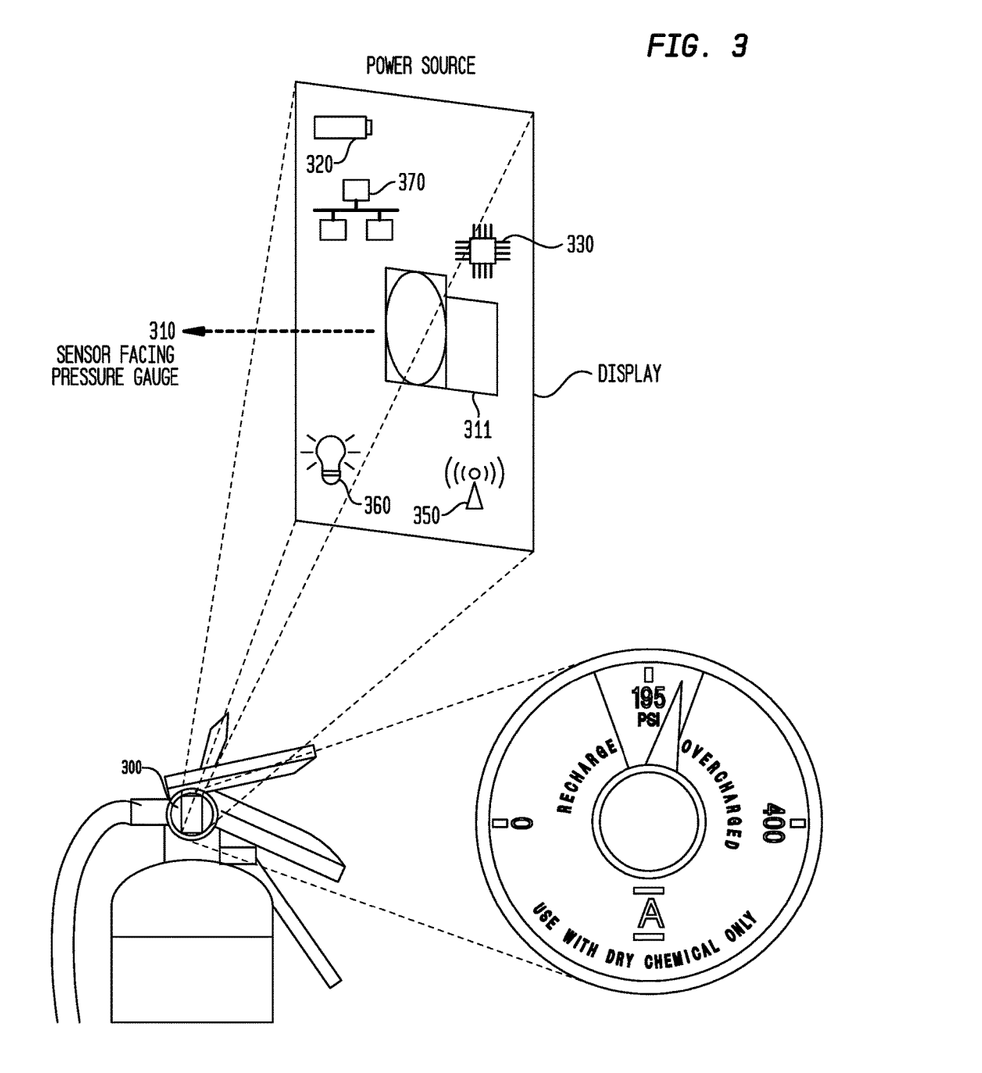
FIG. 3 is a schematic diagram illustrating a monitoring apparatus according to the present disclosure affixed to a portable fire extinguisher.

Turning now to FIG. 3, there is shown a schematic of a fire extinguisher having a pressure gauge with monitoring apparatus 300 according to the present disclosure affixed thereto. As shown in FIG. 3, the monitoring apparatus 300 is affixed to an exterior portion of a pressure gauge with a sensor portion 310 of the apparatus facing inwards—towards the pressure gauge. Operationally, the monitoring apparatus 300 initially determines, then intermittently monitors the operational status of the fire extinguisher by "observing'/measuring the pressure gauge.

In one particular illustrative embodiment, the monitoring apparatus 300 includes a color sensor 311 that monitors—multispectrally—light reflected by the pressure gauge. Additional components contemplated as part of the monitoring apparatus 300 include—in addition to any sensor(s) both monochromatic and multispectral—such apparatus includes a power source 320 (i.e., battery), processor including associated software 330, display (optional) 340, antenna (optional) 350, and light source(s) 360. When so configured, the apparatus 300 may report the operational status of the fire extinguisher via the display or via wireless mechanisms (i.e., WiFi, ZigBee, etc) to other systems including central or other remote monitoring stations/systems. Note that other power/communications structures/functions are contemplated and network connector (optional) 360 may provide networking and power via other known technologies including Ethernet (and in particular power-over-Ethernet POE), Universal Serial Bus (USB) IEEE 1394 (FireWire), and Thunderbolt—among others. Later in this disclosure, we will discuss these system aspects of the present disclosure.

Returning to our operational discussion of monitoring apparatus 300 and as will be readily understood, as the internal pressure of the fire extinguisher changes, the charge status indicator (see., FIGS. 2-210) will reposition (move) in the pressure gauge. Upon such movement, the quantity of observed/detected/reflected color(s) will change. More specifically—and using the green, red, yellow color scheme(s) described previously—as the charge status indicator (yellow) moves, the observed quantity of the color(s) red/green will vary due to the indicator covering/eclipsing one of the colors and uncovering another color. Using the color assumptions noted previously, a measured determination may be made—namely the ratio of red/green observed. When—as a result of subsequent measured determinations—that ratio changes sufficiently—that is to say when the amount of red observed falls below a given threshold—it may be determined that the charge status indicator has repositioned such that a portion of the red region is now eclipsed. In other words, the "needle" is now in the red region and the operational status of the fire extinguisher should be reconsidered. Conversely, when measured red/green ratio changes indicate an increase in the amount of green observed, it may be determined that the charge status indicator has moved into the red region thereby uncovering the additional green so observed and measured.

Accordingly, and assuming the three color scenario as noted above, wherein one color is that of an indicator, and two other colors are those of "OK" and "Recharge/Overcharge" status regions respectively of the pressure gauge, then upon initialization the sensed colors may be represented by:

$$\frac{C_{1t1}}{C_{2t1}} = k1;$$

where $C_1$ and $C_2$ are the color intensities of those two regions identified above in the status regions at time t1. As will be appreciated, if the fire extinguisher is used then the indicator will move thereby changing the ratio of the two colors as the indicator needle uncovers one color and covers (eclipses) another colored region. Accordingly, at some other time t2, the color intensity profile may be represented by:

$$\frac{C_{1t2}}{C_{2t2}} = k2 <> k1;$$

Accordingly, when that ratio changes sufficiently at or above a threshold, it may be determined that the indicator has moved, and a change in the operational readiness has occurred. While such determination may be affected by the physical size of indicator, a change of 0.05% in ratio is sufficient.

As may be appreciated, while we have used the colors red/green/yellow in our illustrative discussion, it will become apparent that our disclosure is not so limited. Of particular importance, structures and methods according to the present disclosure will operate with different color schemes so long as a measurable change in color composition is made in accordance with the above discussion.

Figure 4:
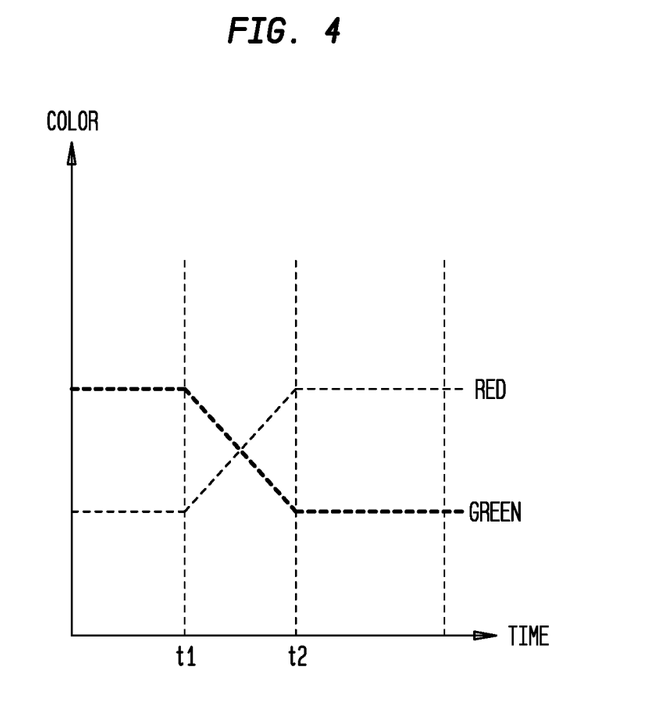
FIG. 4 is a plot showing change in color profile of a sensor monitoring a pressure gauge of a fire extinguisher according to an aspect the present disclosure.

Turning now to FIG. 4, there is shown a plot illustrating principle(s) of color change detection according to the present disclosure. More particularly, the plot shown indicates output values of two different colors (green and red in this illustration) at various points of time. The plot is illustrative of the situation when a charge status indicator moves from—for example—a green (OK) region to a red region. More particularly, prior to time t1, the charge status indicator resides entirely in a green region, so the red value is at a maximum and the green value is at a minimum. As that charge status indicator continues to move toward/into the red region, the plot shows—in the plot region between times t1 and t2—an increase in green output value(s) and a decrease in red output value(s) as measured by detector(s). At time t2, when the charge status indicator resides entirely in a red region, there is no further change in the red/green values.

Figure 5:
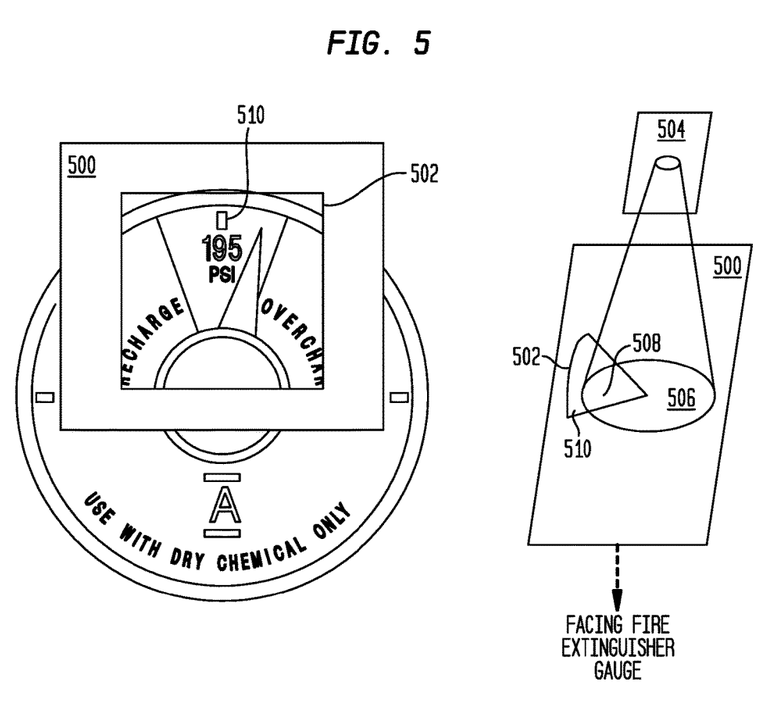
FIG. 5 is a schematic diagram illustrating a sensor monitoring apparatus according to the present disclosure having an adjustable window opening to control the area of detection.

Turning now to FIG. 5, there is shown an alternative monitoring apparatus configuration according to the present disclosure. As depicted in this illustration, the monitoring apparatus including sensor includes an adjustable window or aperture 502 to control the area(s) of detection (and illumination if so equipped). When configured in a manner such as that shown illustratively in FIG. 5, the window opening 502 exposes and therefore permits only part of the pressure sensor status region(s) (green and red in this example) to be viewed by a sensor 504. As shown in FIG. 5, assuming that sensor 504 has a coverage area defined by area 506, then with window 502 the area detected will be 508. In a particular embodiment, window 502 may be adjusted—for example to locate a marker on the right side and out of the window so that the detector/sensor will be able to determine when the indicator moves closer to the red region even though it remains entirely in the green region. Additionally, when configured in this manner and mounted to the pressure gauge of a fire extinguisher, area 510 may be used by an installer to see window position relative to the pressure gauge so that it may be more effectively determined an "edge" of detection and correct alignment of the window.

As previously noted, apparatus, systems and methods according to the present disclosure may be under computer control which may be further networked into a larger computing environment. Still further, the computer may be integrated into and part of the sensor/monitoring apparatus or remote. Notably, the computer may control the operation of the monitoring apparatus according to the present disclosure and report any findings including alarms with respect to the fire extinguisher readiness. Operationally, a monitoring apparatus including sensor(s) may be computer controlled and monitored, either locally or remotely as noted.

Figure 6:
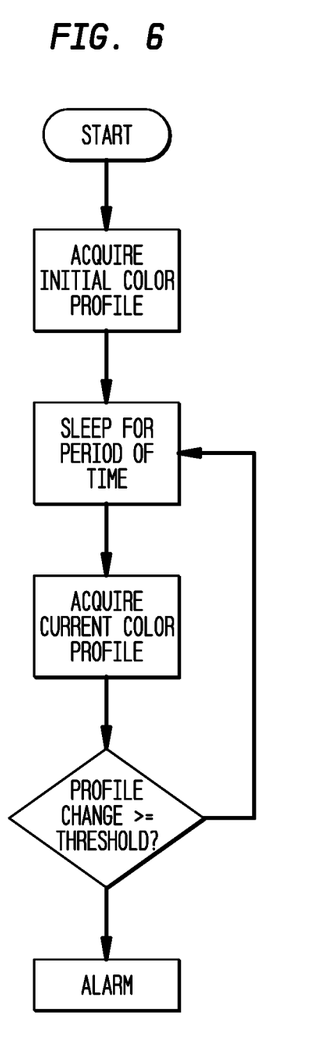
FIG. 6 is a flow diagram illustrating an overview of color sensing monitoring apparatus operation according to an aspect of the present disclosure.

FIG. 6 is an illustrative flow diagram depicting steps associated with the automatic monitoring of a fire extinguisher status according to the present disclosure. More particularly, a monitoring apparatus—including computer controller—will employ any necessary lighting source(s) and detector(s) will first acquire an initial color profile of a pressure gauge of a fire extinguisher. As noted previously, that color profile will include—in the illustrative examples presented—at least a green and a red profile (or other colors associated with the particular gauge). Subsequent to that initial measurement and acquisition of initial color profile, the monitoring apparatus may "sleep" or otherwise enter a low power mode for a pre-determined (or other) period of time. After that period of time has expired, additional, current color profile(s) are acquired. These current profile(s) are then compared to the initial color profile and if sufficiently different then an alarm may be generated. If not, then the monitor apparatus may return to a sleep mode for later, current color profile acquisitions. Of course, such alarm may be reported to displays or other systems for recording and/or alarm notification via wired or wireless methodologies known in the art.

We note at this point that while we have described the monitoring apparatus according to the present disclosure as "sleeping" for a period of time, it is possible that the apparatus includes one or more orientation switches or accelerometers or other structures which may detect movement of the apparatus—and therefore the fire extinguisher. Such movement may terminate the sleep mode and thereby initiate color profile acquisition as movement of the fire extinguisher may be indication of its use and discharge. Periodic, timed acquisitions are contemplated and expected in particular embodiments.

Figure 7:
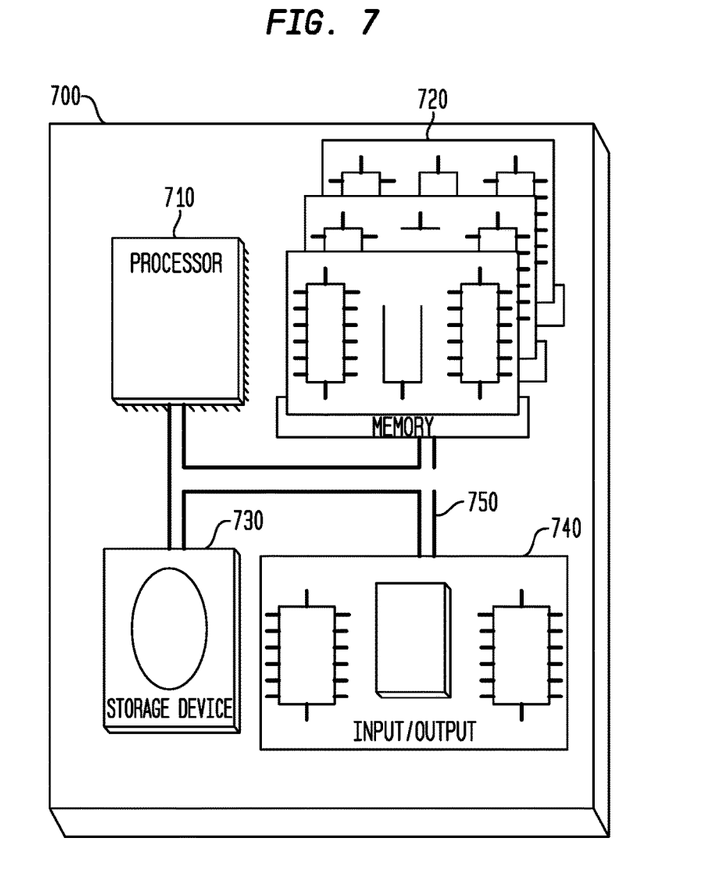
FIG. 7 is a block diagram of an illustrative computer system on which methods of the present disclosure may be implemented or which may be programmed to execute methods according to the present disclosure.

FIG. 7 shows an illustrative computer system 700 suitable for implementing methods and systems according to an aspect of the present disclosure. As may be immediately appreciated, such a computer system may be integrated into another, larger networked system and may be implemented via discrete elements or one or more integrated components. The computer system may comprise, for example a computer running any of a number of operating systems. The above-described methods of the present disclosure may be implemented on the computer system 700 as stored program control instructions.

Computer system 700 includes processor 710, memory 720, storage device 730, and input/output structure 740. One or more input/output devices may include a display 745. One or more busses 750 typically interconnect the components, 710, 720, 730, and 740. Processor 710 may be a single or multi core. Additionally, the system may include accelerators etc. further comprising a system on a chip.

Processor 710 executes instructions in which embodiments of the present disclosure may comprise steps described in one or more of the Drawing figures. Such instructions may be stored in memory 720 or storage device 730. Data and/or information may be received and output using one or more input/output devices.

Memory 720 may store data and may be a computer-readable medium, such as volatile or non-volatile memory. Storage device 730 may provide storage for system 700 including for example, the previously described methods. In various aspects, storage device 730 may be a flash memory device, a disk drive, an optical disk device, or a tape device employing magnetic, optical, or other recording technologies.

Input/output structures 740 may provide input/output operations for system 400 to one or more sensors, illumination sources etc., that may be used to control and/or provide feedback to which computer system 700 is communicatively coupled. Input/output structures 740 may additionally provide any of a number of communications technologies in support of networking—both wired and/or wireless—and in certain instantiations may power the system as well. Input/output structures may also include any of a variety of known interface structures suitable for interconnecting additional capabilities such as Analog/Digital or Digital/Analog converters. Finally, note that these structures are presented as being illustrative and while shown as being discrete, they may be integrated into a single chip or other platform as design or application needs dictate.

Figure 8:
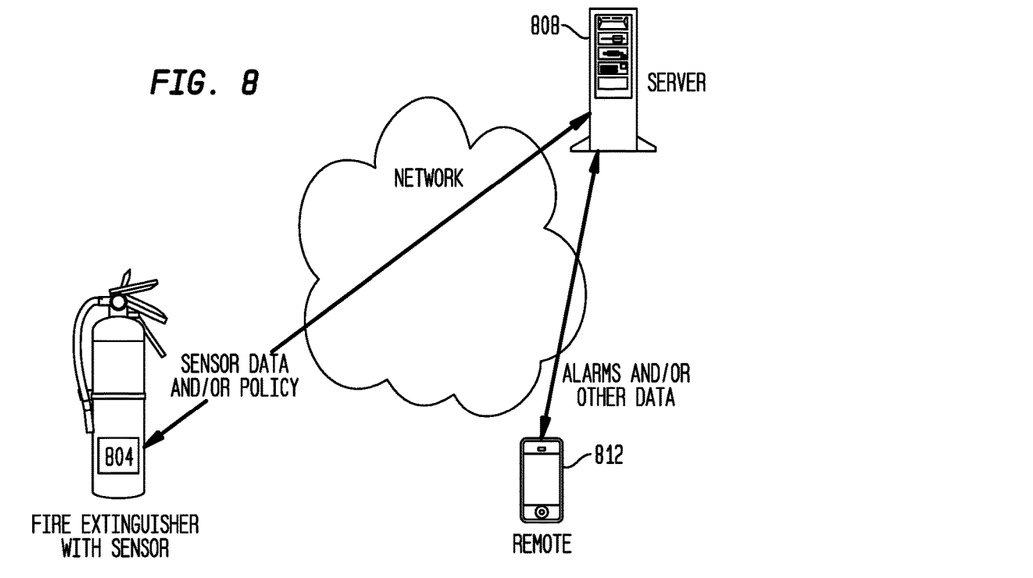
FIG. 8 is a schematic diagram illustrating a monitoring apparatus affixed to a fire extinguisher and communicating/reporting via network to server and operator(s) according to the present disclosure

Turning now to FIG. 8, there is shown in schematic form a monitoring apparatus 804 according to the present disclosure attached to a fire extinguisher 802 further communicatively coupled to a network server 808 via network 806. As may be observed and as previously discussed and described, apparatus 804—including sensors and other components/systems—is affixed to the fire extinguisher to monitor its operational status and communicate that status to persons or other systems or alarms. Notably, such status communication may employ either/both wired/wireless technologies including Ethernet, ZigBee and WiFi—among others.

At this point we note that while a local determination of operational status may be made by apparatus as previously described, when configured as shown in FIG. 8 wherein monitoring apparatus 804 is communicatively coupled to a server 808 via network, the status determination may advantageously be made by server or other system to which server is communicatively coupled (not specifically shown). Accordingly, when so configured, monitoring apparatus 804 may send only sensor data to server 808 which then determines operational status from that data. In this manner, the server 808 may maintain a database of any number of monitoring apparatus such as that depicted by 804 and subsequently present to user(s) or operator(s) the operational status of any set of those apparatus. Such presentation may be made via direct display, web interface, text, email, etc among other methods. When necessary, server may send alarm message(s) to persons—by, for example smartphone 812—such that appropriate actions may be taken. In combination or in the alternative, visual, audible or other alarms may be initiated to notify—for example—operators local to the monitoring system and fire extinguisher(s).

Note further that when configured in a network with servers as described, the server may collect data from one or more monitoring apparatus and employed learned knowledge from historical data and human or machine inputs to optimize or generate a new policy that may—in particular embodiments—be provided to apparatus 804 to alter or otherwise change alarm and/or reporting conditions.

Figure 9:
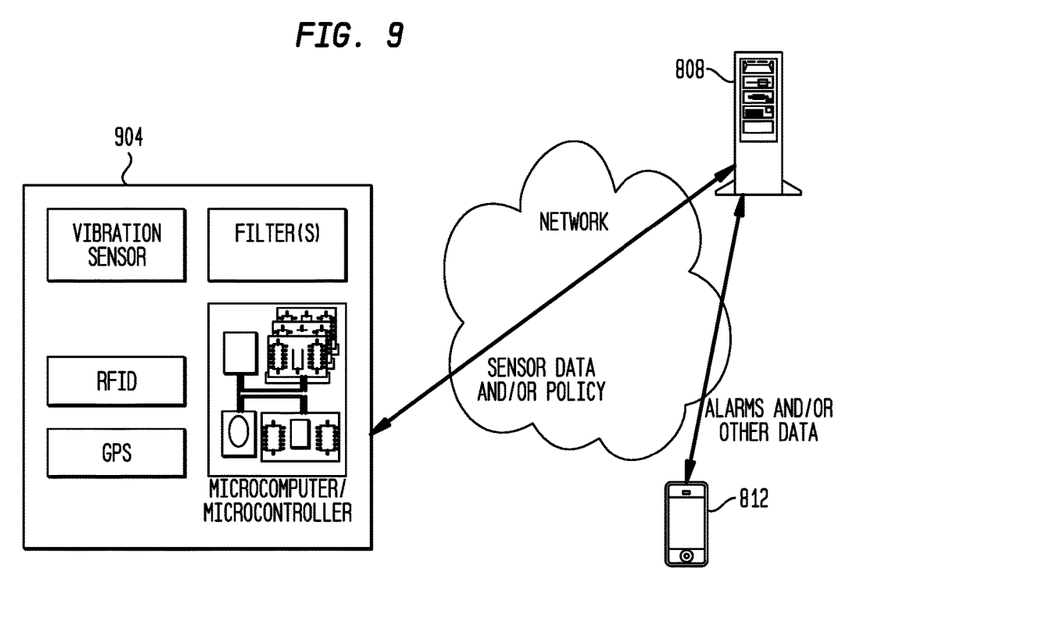
FIG. 9 is a schematic block diagram illustrating a monitoring apparatus with vibration sensor and data capturing in conjunction with communications and servers according to the present disclosure

Turning now to FIG. 9, there is shown a schematic block diagram wherein monitoring apparatus 904 includes a vibration sensor which as those skilled in the art will appreciate may be an accelerometer constructed using known microelectronic techniques and materials. When so equipped, the monitoring apparatus 904 is able to detect small vibration(s) that may be caused by events such as leakage of the fire extinguisher, collision, movement, etc which may result from the fire extinguisher being used or otherwise moved from its known location. When such movement occurs, in-person inspection may be required to verify its operational readiness.

Note further that the monitoring apparatus such as that shown and described may include other sensors such as GPS location. In this manner, if the fire extinguisher is moved, its location may be tracked via GPS. An alternative—or that may be used in conjunction with GPS technologies—are wireless real-time locating systems (RTLS) that may employ wireless "tags" using RFID techniques which may advantageously communicate via WiFi technologies—or others—to identify the location of the tags or identify movement as the tags move through "chokepoints" positioned in various locations. Advantages to these active RFID technologies are their extreme low power requirements and the number of VLSI components that employ/provide same.

With continued reference to FIG. 9, it is further noted that in particular embodiments data from vibration sensor is continuously acquired and processed. Microcomputer/microcontroller collaborates with a server and through the effect of a machine learning scheme may advantageously "filter" out noise or other activities such as footsteps that are not indicative of use and/or operational readiness of the fire extinguisher. In certain embodiments, microcontroller may include internal processing methods that extract sensed patterns, the extracted patterns are then sent to server for feedback from an operator or further processed by the server before presentation to a human operator. Advantageously, human input processed by server may generate policy(ies) for abstracted patterns which are then returned to monitoring apparatus and in particular microcontroller. Monitoring apparatus' microcontroller may then use such policy(ies) for subsequent processing and filtering thereby eliminating noise communication between apparatus and server. In alternative embodiments, apparatus microcontroller may disable any local filtering such that raw data is periodically sent to server for "reset" of the policy/filtering methodologies employed.

We note further at this point that in a particular embodiment apparatus microcontroller may initially forward all collected data from vibration sensor (or other sensors, i.e., GPS, RFID) to server. Server may then perform machine learning based policy generation and interaction with human operator, and then generate current filtering policy and return same to microcontroller for updated operation. In particular embodiments, such generated policy may be a threshold—for example—vibration threshold. Alternatively, the threshold policy may include threshold relative to color composition so detected by color sensors described previously. Accordingly, when a detected vibration (for example) value is higher than a certain level, the microcontroller reports the detected data to server for further processing and/or storage and/or reporting. For power saving purposes, apparatus may include a threshold that must be reached before any further communication with server occurs— either by wireless or wired mechanisms. Operationally, the apparatus microcontroller may employ this threshold as an interrupt signal which "awakens" a microcontroller in "sleep" or other low power state.

Figure 10:
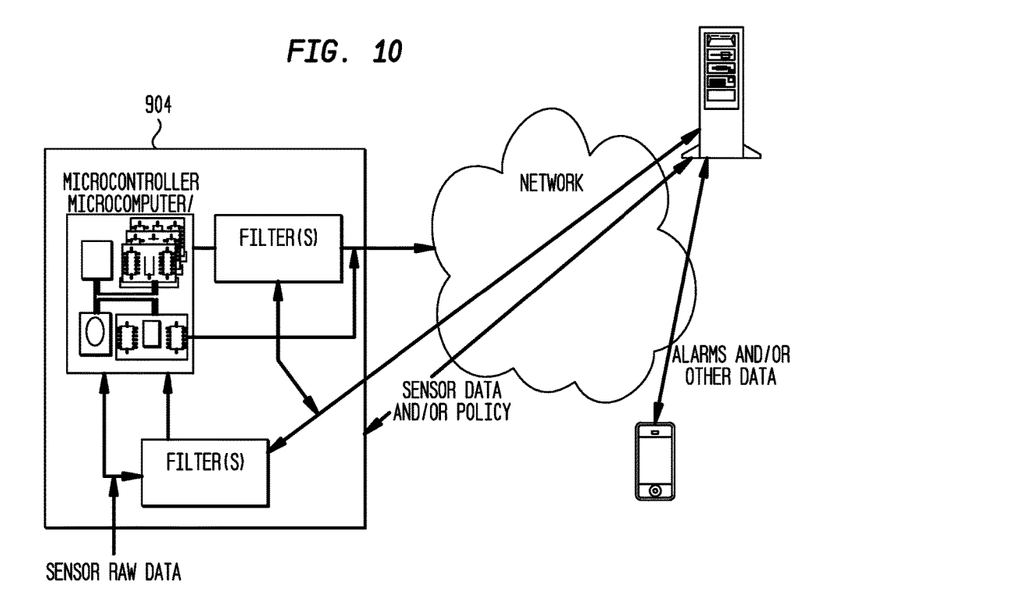
FIG. 10 is a schematic block diagram illustrating a microcontroller/microcomputer of a monitoring apparatus according to the present disclosure communicating with server(s) via communications network according to the present disclosure.

With reference now to FIG. 10, there is shown a schematic block diagram of a monitoring apparatus according to the present disclosure including a microcontroller/microcomputer interacting with a server wherein processing is performed by microcontroller. As illustrated in FIG. 10, microcontroller receives input from vibration sensor. Initially, processing unit acquires data from sensor and extracts pattern(s), which are then sent to server. Microcontroller employs feedback from server to configure/reconfigure one or more filters and policies—including those related to input noise and pattern filters. Notably, noise filter may be positioned at input of signal before processing to remove noise. Advantageously, noise filtering may be performed by programmable hardware and software components as part of overall processing unit or discretely. Pattern filter may be positioned after processing module to remove—for example—normal, patterns (i.e., footsteps, or environmental noise). In one embodiment, parameters within processing module may be configured using feedback received from server. Periodically, processing module may receive input directly from sensors or other input as signals (bypassing noise filter) and sends all processed patterns to server to refresh/regenerate filtering/policy(ies).

Functionally, it may be observed that as depicted in FIG. 10, machine learning related processing is performed in monitoring apparatus by local microcontroller while server includes human interface(s) to provide feedback to human operators and generate any alarms. Note that data management/maintenance are not specifically shown in this FIG. 10.

Figure 11:
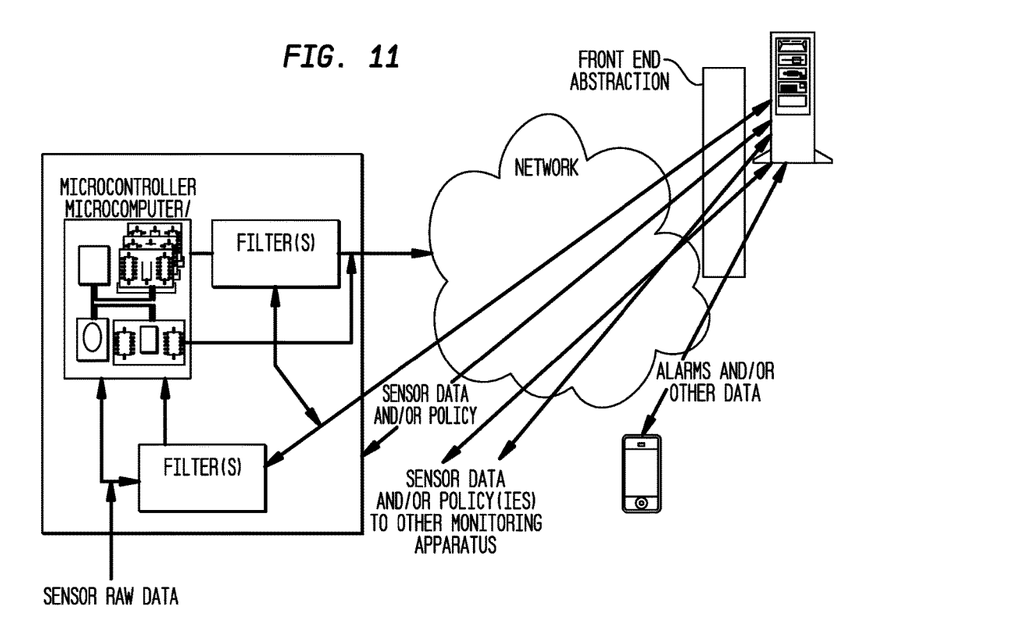
FIG. 11 is a schematic block diagram illustrating a microcontroller/microcomputer of a monitoring apparatus according to the present disclosure communicating with server via communications network with further processing/pattern abstraction performed in server.

Turning now to FIG. 11, there is shown in schematic form a configuration according to the present disclosure in which server includes additional level(s) of abstraction using data from multiple monitoring apparatus' and their respective microcontrollers/microcomputers. Such abstraction module(s) may process filtered (i.e. output from various apparatus) or unfiltered (output from other apparatus) pattern(s) or sensed raw data (output from yet another apparatus). This processing result is provided to human operator(s) interface for notification, policy interaction and/or alarm generation and action.

In one particular embodiment, a signal generated from the filter module may include logic to indicate whether a detected signal is above a pre-determined threshold. Such signal may be used to wakeup microcontroller/microcomputer which may be placed into a sleep or low activity mode to conserve power. Accordingly, microcontroller will exit sleep mode when signal having sufficient threshold condition is received. Alternatively, microcontroller may be activated from sleep mode by an intermittent timer or other circuitry known in the art.

Note that these illustrations shown in the drawing and associated figures are for illustrative purposes only. Specific implementations and communication flows may not all be specifically shown.

As noted previously, monitoring apparatus may also detect detachment/movement of the attached fire extinguisher. In particular embodiments, the microcontroller/microcomputer may utilize movement/vibration/acceleration data to determine relative location from origin.

Figure 12:
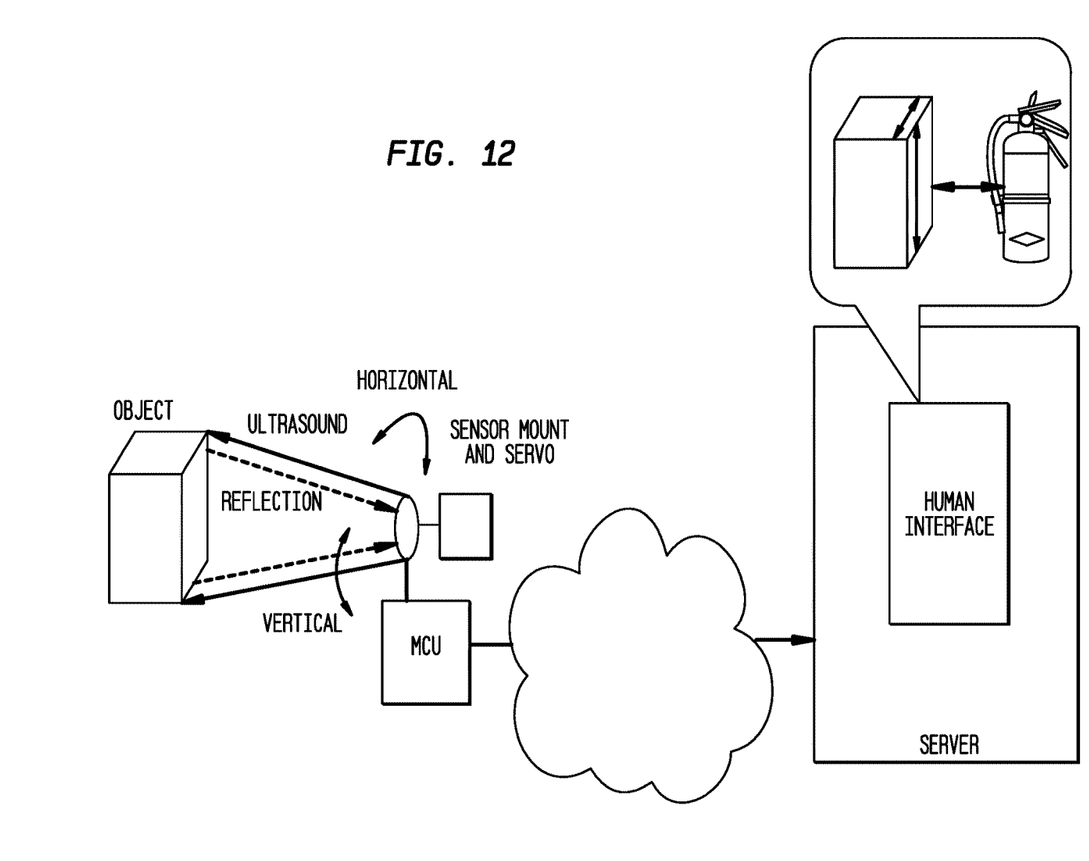
FIG. 12 is a schematic block diagram of an illustrative monitoring apparatus including an ultrasound sensor and servo motor for blockage detection and further server side blockage and/or image regeneration according to the present disclosure.

Finally, we note with reference to FIG. 12, that a monitoring apparatus according to the present disclosure when coupled with proximity sensors including ultrasound, laser, radar, etc may effectively determine if and/or when physical access to the fire extinguisher to which the apparatus is attached is blocked. As schematically illustrated in FIG. 12, an ultrasonic sensor is directed to a proximate area where access blockage is to be avoided. Such a sensor may output data indicative of distance from the sensor to an object that may cause blockage. Note that short-lived or intermittent blockage may be detected/determined by programming a microcomputer/microcontroller to recognize such transient blockage, and ignore them or otherwise not report them when they are short lived. Additionally, the monitoring apparatus may detect objects within a pre-set distance, and whether or not such object(s) are blocking access for a sufficient period of time to precipitate an alarm. Only objects that are with such distances for a pre-determined period of time will be reported and generate alarms. As may be appreciated, such ultrasonic sensors may be mounted on a rotating platform so that a wider field of view is observed. Alternatively, when radar and/or lidar technologies are employed, rotating scans of proximate areas are performed such that all avenues of blockage may be evaluated.

At this point, while we have presented this disclosure using some specific examples, those skilled in the art will recognize that our teachings are not so limited. Accordingly, this disclosure should be only limited by the scope of the claims attached hereto.

The invention claimed is:

1. An apparatus for monitoring operational readiness of a fire extinguisher comprising:
an optical sensor assembly attachable to a pressure gauge of the fire extinguisher, said pressure gauge exhibiting at least two different colored regions; said sensor assembly configured to:
optically sense, at time t1, first color intensities of the at least two different regions which is represented as $C(1t1)/C(2t1)=k1$, where the $C(1t1)$, $C(2t1)$ are the first color intensities of those two regions sensed at the time t1;
and optically sense, at a later time t2, second color intensities of the at least two different regions which is represented as $C(1t2)/C(2t2)=k2$, where the $C(1t2)$ and $C(2t2)$ are the second color intensities of those two regions sensed at the later time t2; and
reporting a color profile data of the pressure gauge, when the k1 and k2 differ by at least a pre-determined amount;
wherein a server system configured to receive the reported color profile data from the sensor assembly.

2. The apparatus according to claim 1 further comprising an adjustable sensed window configurable to alter an area of the pressure gauge.

3. The apparatus according claim 2 wherein the sensor assembly is configured to sense when an indicator of the pressure gauge enters or exits the sensed window.

4. The apparatus according to claim 1 further comprising a power source.

5. The apparatus according to claim 1 further comprising a processor configured to process data sensed by the sensor assembly.

6. The apparatus according to claim 5 wherein the processor is configured to periodically activate sensor activity and then enter a low power mode subsequently.

7. The apparatus according to claim 1 further comprising a light source to illuminate the pressure gauge.

8. The apparatus according to claim 1 wherein the pre-determined amount is >0.05%.

9. A method of retrofitting a fire extinguisher to determine operational readiness comprising:
attaching a monitoring apparatus to a pressure gauge of the fire extinguisher, said pressure gauge exhibiting at least two different colored regions; said apparatus including an optical sensor assembly configured to:
optically sensing, at time t1, first color intensities of the at least two different regions which is represented as $C(1t1)/C(2t1)=k1$, where the $C(1t1)$, $C(2t1)$ are the first color intensities of those two regions sensed at the time t1;
and optically sensing, at a later time t2, second color intensities of the at least two different regions which is represented as $C(1t2)/C(2t2)=k2$, where the $C(1t2)$ and $C(2t2)$ are the second color intensities of those two regions sensed at the later time t2; and reporting a color profile data of the pressure gauge, when the k1 and k2 differ by at least a pre-determined amount;
wherein a server system configured to receive the reported color profile data from the optical sensor.

10. The method according to claim 9 further comprising:
adjusting an adjustable sensed window of the apparatus such that it is configured to set an area of the pressure gauge sensed by the optical sensor.

11. The method according to claim 10 wherein said monitoring apparatus comprises a power source.

12. The method according to claim 11 wherein said monitoring apparatus further comprises a processor configured to process data sensed by the optical sensor.

13. The method according to claim 12 wherein said monitoring apparatus further comprises a light source configurable to illuminate the pressure gauge.

14. The method according to claim 12 wherein said monitoring apparatus is configured to sense when an indicator of the pressure gauge enters or exits the area set by the sensed window.

15. The method according to claim 14 wherein said monitoring apparatus is configured to periodically activate sensor activity and then enter a low power mode subsequently.

16. A method for monitoring an operational readiness of a fire extinguisher, said method comprising:
having a pressure gauge exhibiting at least two different colored regions;
by a computer controlled monitoring apparatus including an optical sensor assembly attached to the pressure gauge;
optically sensing by the optical sensor, at time t1, first color intensities of the at least two different regions which is represented as $C(1t1)/C(2t1)=k1$, where the $C(1t1)$, $C(2t1)$ are the first color intensities of those two regions sensed at the time t1;
and optically sensing by the optical sensor, at a later time t2, second color intensities of the at least two different regions which is represented as $C(1t2)/C(2t2)=k2$, where the $C(1t2)$ and $C(2t2)$ are the second color intensities of those two regions sensed at the later time t2; and
reporting a color profile data of the pressure gauge, when the k1 and k2 differ by at least a pre-determined amount;
wherein a server system configured to receive the reported color profile data from the optical sensor.

17. The method according to claim 16 wherein the monitoring apparatus includes an adjustable window configurable to alter an area of the pressure gauge sensed and the color profiles are determined for that window area.

18. The method according to claim 16 further comprising energizing a light source to illuminate the pressure gauge.

19. The method according to claim 18 wherein the pre-determined amount is at least 0.05%.

* * * * *